United States Patent
Li et al.

(10) Patent No.: US 10,884,425 B2
(45) Date of Patent: Jan. 5, 2021

(54) AUTONOMOUS TRAILER HITCHING USING NEURAL NETWORK

(71) Applicant: Continental Automotive Systems, Inc., Auburn Hills, MI (US)

(72) Inventors: Dalong Li, Rochester Hills, MI (US); Kyle P Carpenter, Rochester, MI (US); Dominik Froehlich, Royal Oak, MI (US); Ibro Muharemovic, Warren, MI (US); Julien Ip, Madison Heights, MI (US); Lubna Khasawneh, Rochester Hills, MI (US); Uriel Sanchez, Tlajomulco de Zuniga (MX); Steffen Hartmann, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 123 days.

(21) Appl. No.: 16/141,608

(22) Filed: Sep. 25, 2018

(65) Prior Publication Data
US 2019/0094872 A1    Mar. 28, 2019

Related U.S. Application Data

(60) Provisional application No. 62/562,734, filed on Sep. 25, 2017.

(51) Int. Cl.
B60G 17/015    (2006.01)
G05D 1/00      (2006.01)
G06K 9/00      (2006.01)
G05D 1/02      (2020.01)
G01C 21/36     (2006.01)
B60D 1/62      (2006.01)
B60D 1/06      (2006.01)
B60D 1/36      (2006.01)

(52) U.S. Cl.
CPC ............ G05D 1/0231 (2013.01); B60D 1/06 (2013.01); B60D 1/36 (2013.01); B60D 1/62 (2013.01); B60G 17/015 (2013.01); G01C 21/3623 (2013.01); G05D 1/0016 (2013.01); G05D 1/0038 (2013.01); G05D 1/0225 (2013.01); G06K 9/00355 (2013.01); G06K 9/00805 (2013.01); B60G 2300/044 (2013.01); B60G 2500/30 (2013.01); G05D 2201/0213 (2013.01)

(58) Field of Classification Search
CPC ...... B60D 1/06; B60D 1/36; B60G 2300/044; G06K 9/00355
See application file for complete search history.

(56) References Cited

U.S. PATENT DOCUMENTS

2015/0251697 A1* 9/2015 Lavoie .................... B62D 13/06
                                                   701/523
2016/0039429 A1* 2/2016 Abou-Nasr ........... B60W 50/10
                                                   382/103
2017/0158007 A1* 6/2017 Lavoie ...................... B60T 7/20

* cited by examiner

Primary Examiner — Anshul Sood

(57) ABSTRACT

One aspect of the disclosure provides a method of maneuvering a vehicle in reverse for attachment to a trailer. The method includes: determining, at a computing device in communication with the neural network, a selected trailer in proximity to the vehicle; detecting at least one user input gesture performed by a user and captured in at least one image from at least one camera on the vehicle; selected a maneuver command for the vehicle based on the detected gesture; and executing the maneuver to move the vehicle from the initial position toward a final position adjacent the trailer.

13 Claims, 7 Drawing Sheets

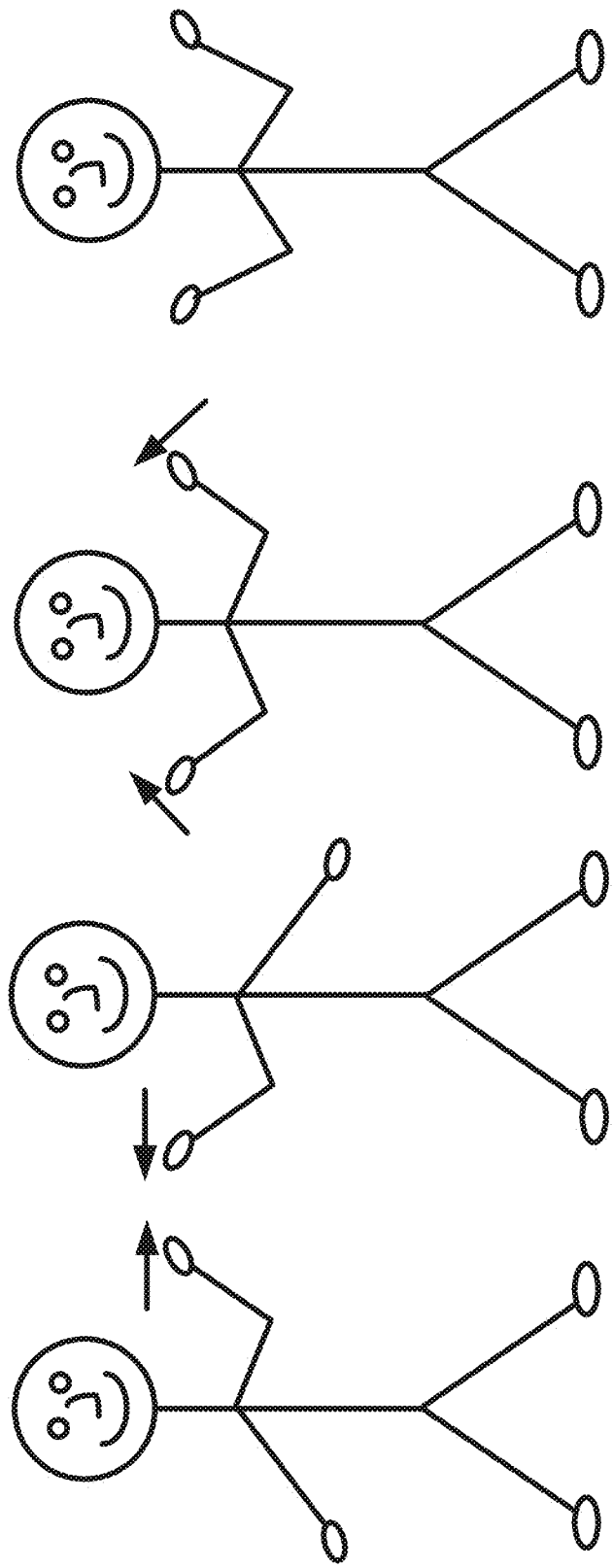

AUTONOMOUS TRAILER HITCHING USING NEURAL NETWORK

TECHNICAL FIELD

This disclosure relates to an automotive vehicle configured to identify one or more trailers positioned behind the automotive vehicle and drive to one of the one or more trailers.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some of the challenges that face tow vehicle drivers are connecting the tow vehicle to the trailer, because more than one person is needed. For example, one person drives the vehicle, e.g., the driver, and another one or more people are needed to view the tow vehicle and the trailer and provide the driver with direction regarding the path the tow vehicle has to take to align with the hitch. If the people providing directions to the driver are not accustomed to hitching a tow vehicle to a trailer, then they may have difficulty providing efficient instructions for directing the path of the tow vehicle.

Recent advancements in sensor technology have led to improved safety systems for vehicles. Arrangements and methods for detecting and avoiding collisions are becoming available. Such driver assistance systems use sensors located on the vehicle to detect an ongoing collision. In some examples, the system may warn the driver of one or more driving situations to prevent or minimize collisions. Additionally, sensors and cameras may also be used to alert a driver of possible obstacles when the vehicle is traveling in a forward direction. Therefore, it is desirable to provide a system that includes sensors to overcome the challenges faced by drivers of tow vehicles.

SUMMARY

One aspect of the disclosure provides a method of maneuvering a vehicle in reverse for attachment to a trailer. The method includes: determining, at a computing device in communication with the neural network, a selected trailer in proximity to the vehicle; detecting at least one user input gesture performed by a user and captured in at least one image from at least one camera on the vehicle; selected a maneuver command for the vehicle based on the detected gesture; and executing the maneuver to move the vehicle from the initial position toward a final position adjacent the trailer.

Implementations of the disclosure may include one or more of the following optional features. In some implementations, determining, a vehicle path from the initial position to the final position adjacent the trailer, the vehicle path comprising maneuvers configured to move the vehicle along the vehicle path from the initial position to the final position; following, at a drive system in communication with the computing device, the vehicle path from the initial position based upon a user input gesture to begin path following; stopping or halting, at the drive system, the vehicle when at least one of: a stop or halt input gesture from the user is detected, or the vehicle is at an intermediate position before reaching the final position, the intermediate position being closer to the final position than the initial position; modifying, at the drive system, one or more vehicle suspensions associated with the vehicle to align a vehicle hitch with a trailer hitch based upon one of: the determined vehicle path and at least one a user input gesture to modify the drive system or vehicle suspensions; and following, at the drive system, the vehicle path from the intermediate position to the final position based upon a user input gesture to begin path following.

In some implementations, the maneuvers include, steering, braking, and speeding. The method may further include: continuously detecting, by the neural network, one or more objects within the vehicle path as the vehicle is moving along the vehicle path. The method may also include when detecting an object, altering the vehicle path at the computing device. In some examples, detecting by a neural network of the vehicle a gesture performed by the user in one or more images; and detecting, by a neural network of the vehicle, one or more trailers within one or more images and receiving, at a user interface in communication with the neural network, an indication of a selected trailer from the one or more detected trailers. Detecting one or more trailers may include: capturing, at one or more imaging devices in communication with the neural network, one or more images, at least one of the one or more imaging devices positioned on a back side of the trailer facing a rearward direction; and determining, at the neural network, at least one of: a user gesture and the one or more trailers within the at least one image. The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A-4D are schematic views of a first set of exemplary user gestures for control input for the driver assistance system.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable to autonomously maneuvering towards a trailer and attaching to the trailer, thus eliminating the need for a driver to drive the tow vehicle in a rearward direction while another one or more people provide the driver with directions regarding the path that the tow vehicle has to take to align with the trailer and ultimately a hitch of the trailer. As such, a tow vehicle with an autonomous rearward driving and hitching feature provides a driver with a safer and faster experience when hitching the tow vehicle to the trailer.

Figure 1:
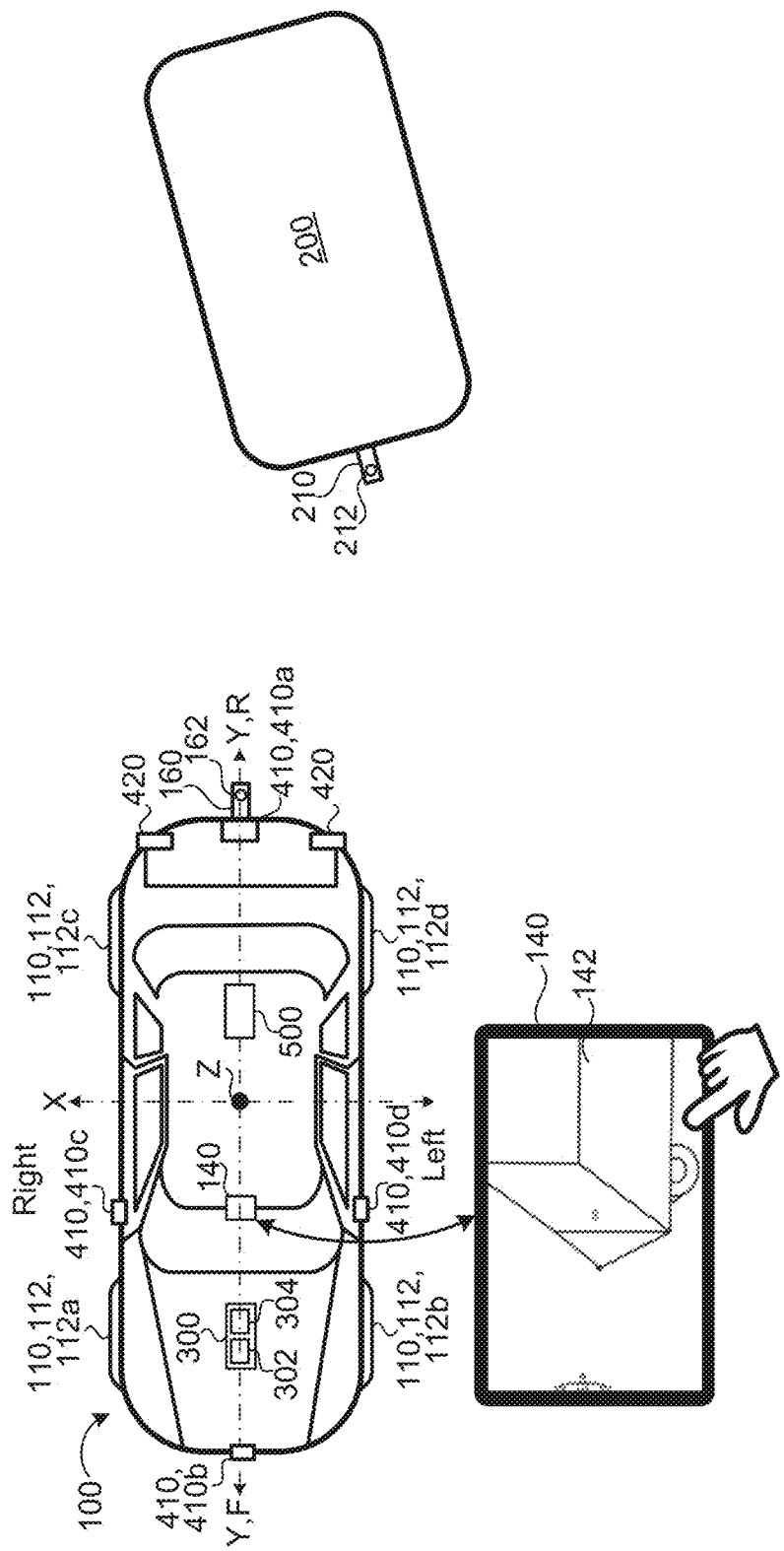
FIG. 1 is a schematic view of an exemplary tow vehicle having a user interface displaying an indication of trailers behind the tow vehicle.
Figure 2A:
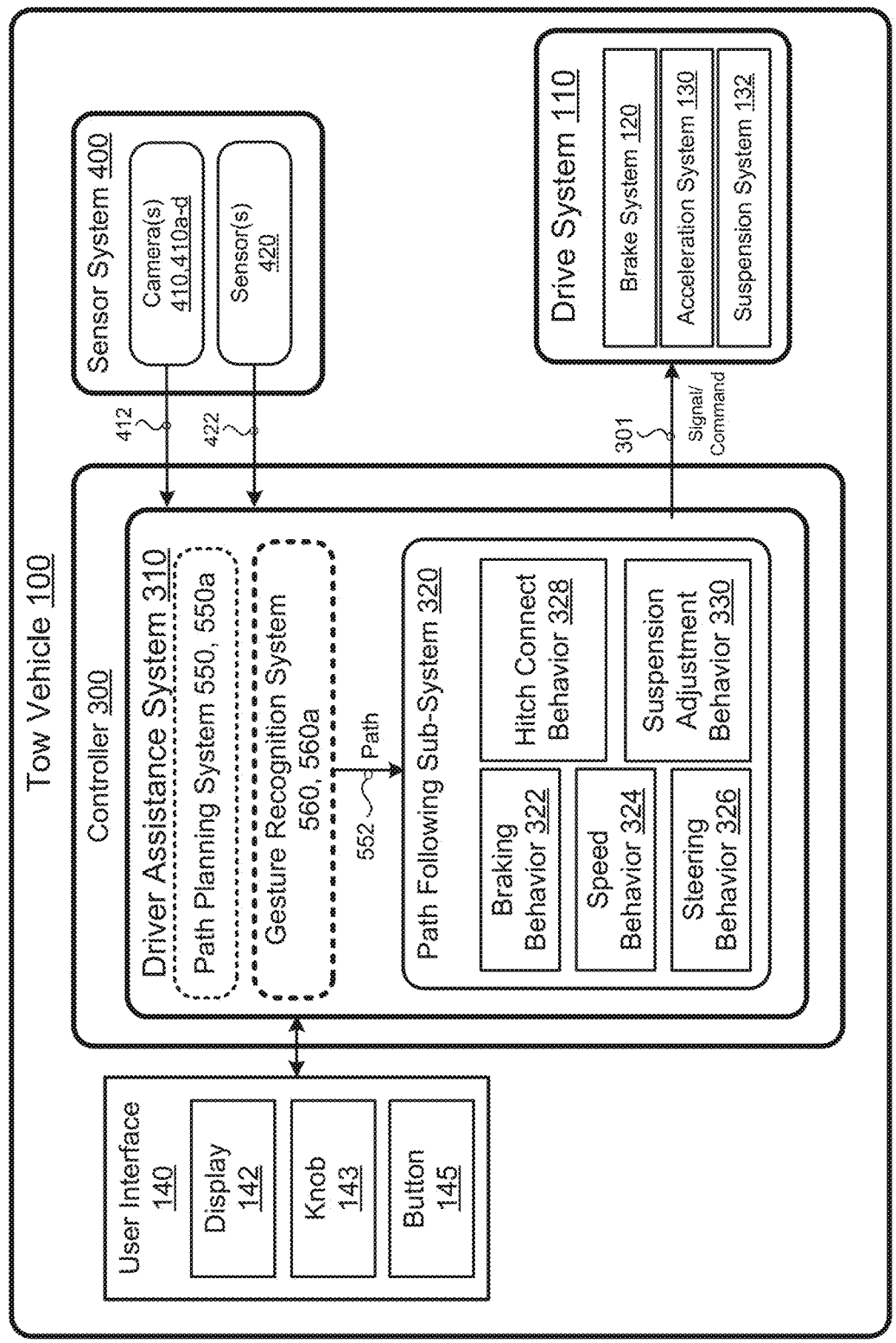
FIGS. 2A-2B are schematic views of an exemplary tow vehicle.
Figure 2B:
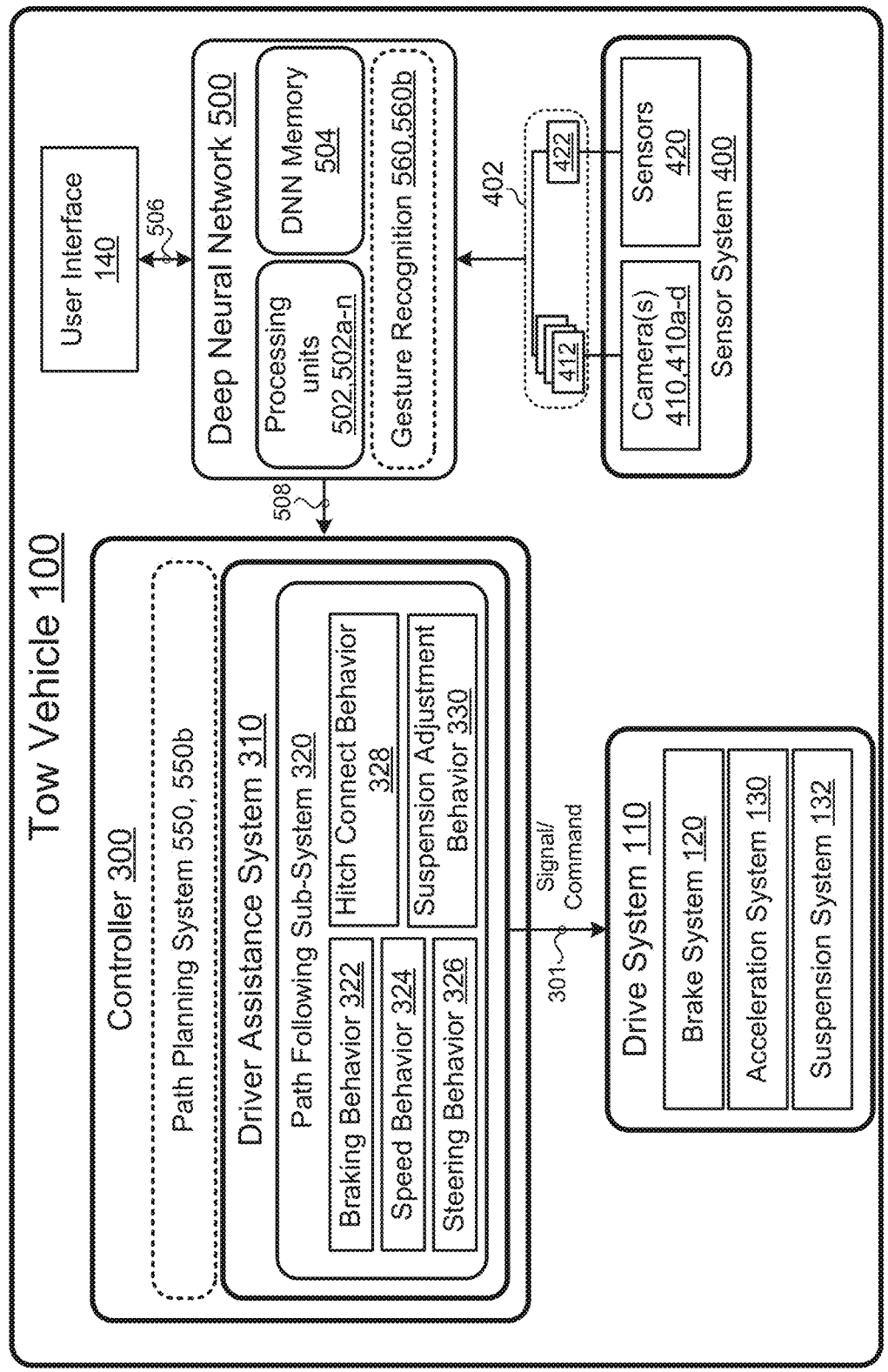

Referring to FIGS. 1-2B, in some implementations, a driver of a tow vehicle 100 wants to tow a trailer 200. The tow vehicle 100 may be configured to autonomously drive towards the trailer 200. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 120 that includes brakes associated with each wheel 112, 112a-d, and an acceleration system 130 that is configured to adjust a speed and direction of the tow vehicle 100. In addition, the drive system 110 may include a suspension system 132 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 132 improves the road handling of the tow vehicle 100 and provides a better ride quality by isolating road noise, bumps, and vibrations. In addition, the suspension system 132 is configured to adjust a height of the tow vehicle 100 allowing the tow vehicle hitch 160 to align with the trailer hitch 210, which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x, extends between a right side R and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 132 adjusts the suspension of the tow vehicle 100, the tow vehicle 100 may tilt about the X axis and or Y axis, or move along the central vertical axis Z.

The tow vehicle 100 may include a user interface 140, such as, a display 142. The user interface 140 receives one or more user commands from the driver via one or more input mechanisms 143, 145, 410, 410a-d or a touch screen display 142 and/or displays one or more notifications to the driver. The user interface 140 is in communication with a vehicle controller 300, which is in turn in communication with a sensor system 400, in particular a camera(s) 410, 410a-d. In some examples, the user interface 140 displays an image of an environment of the tow vehicle 100 leading to one or more commands being received by the user interface 140 (from the driver) that initiate execution of one or more behaviors. The vehicle controller 300 includes a computing device (or processor) 302 (e.g., central processing unit having one or more computing processors) in communication with non-transitory memory 304 (e.g., a hard disk, flash memory, random-access memory) capable of storing instructions executable on the computing processor(s)).

The vehicle controller 300 executes a driver assistance system 310, which in turn includes a path following subsystem 320. A gesture recognition system 560 interprets gestures (movement) made by a user into commands for the diver assistance system 310. A path planning system 550 then determines a path 552 based upon the input gestures. The path following sub-system 320 receives the path 552 from the path planning system 550 and executes behaviors 322-330 that send commands 301 to the drive system 110, leading to the tow vehicle 100 autonomously driving about the planned path 552 in a rearward direction R.

Figure 3A:
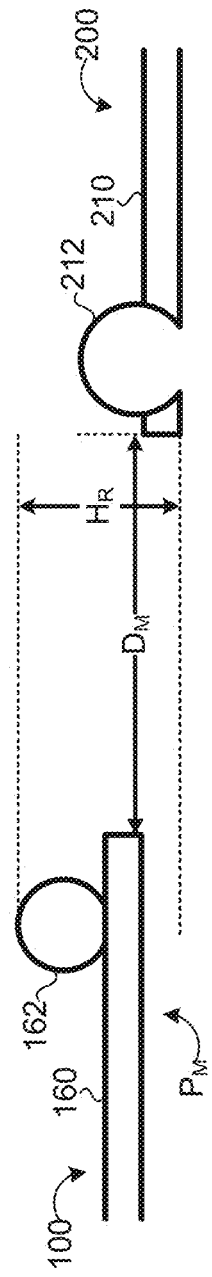
FIGS. 3A-3D are perspective views of an exemplary vehicle hitch connecting to a trailer hitch.
Figure 3B:
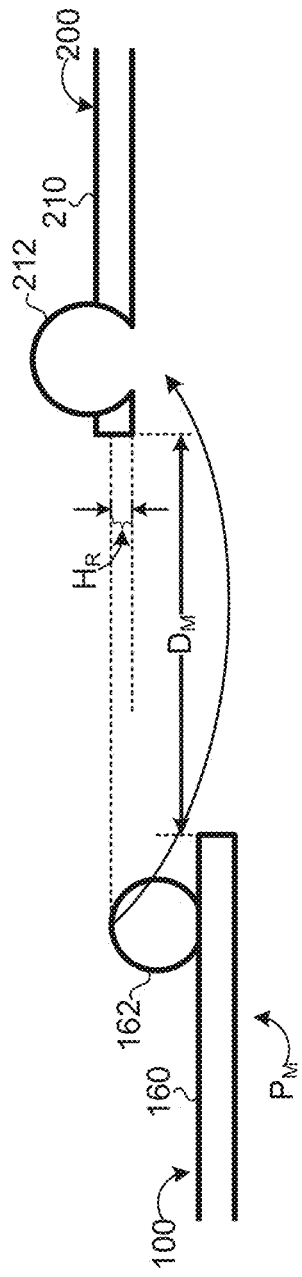
Figure 3C:
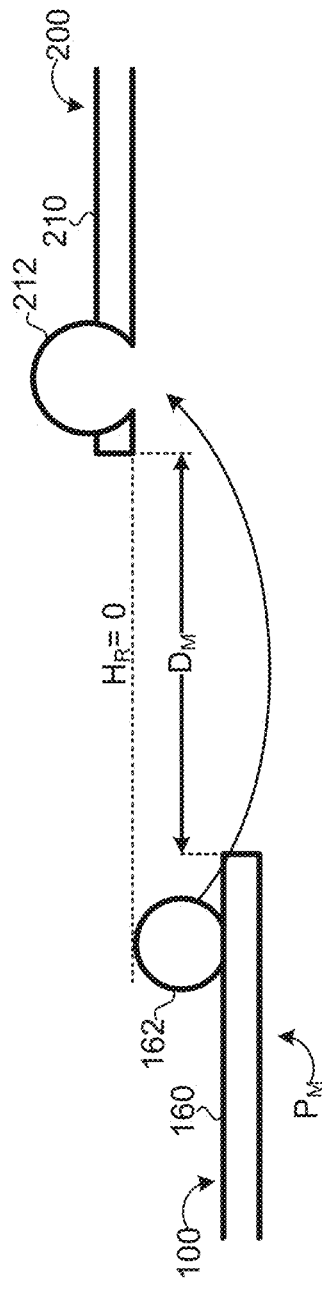

The path following sub-system 320 includes, a braking behavior 322, a speed behavior 324, a steering behavior 326, a hitch connect behavior 328, and a suspension adjustment behavior 330. Each behavior 322-330 cause the tow vehicle 100 to take an action, such as driving backward, turning at a specific angle, breaking, speeding, slowing down, among others. The vehicle controller 300 may maneuver the tow vehicle 100 in any direction across the road surface by controlling the drive system 110, more specifically by issuing commands 301 to the drive system 110. For example, the vehicle controller 300 may maneuver the tow vehicle 100 from an initial position (as shown in FIG. 3A) to a final position (as shown in FIG. 3C). In the final position, a hitch ball 162 of the tow vehicle 100 aligns with a hitch coupler 212 of the trailer 200 connecting the tow vehicle 100 and the selected trailer 200.

The tow vehicle 100 may include a sensor system 400 to provide reliable and robust autonomous driving. The sensor system 400 may include different types of sensors that may be used separately or with one another to create a perception of the tow vehicle's environment that is used for the tow vehicle 100 to autonomously drive and make intelligent decisions based on objects and obstacles detected by the sensor system 400. The sensors may include, but not limited to, one or more imaging devices (such as cameras) 410, and sensors 420 such as, but not limited to, radar, sonar, LIDAR (Light Detection and Ranging, which can entail optical remote sensing that measures properties of scattered light to find range and/or other information of a distant target), LADAR (Laser Detection and Ranging), etc. In addition, the camera(s) 410 and the sensor(s) 420 may be used to alert the driver of possible obstacles when the tow vehicle 100 is traveling in the forward direction F or in the rearward direction R, by way of audible alerts and/or visual alerts via the user interface 140. Therefore, the sensor system 400 is especially useful for increasing safety in tow vehicles 100 which operate under semi-autonomous or autonomous conditions. While the camera(s) 410 are part of the sensing system 400 they may also act as part of the user interface 140, by way of the gesture recognition system which perform image analysis on the recorded images to interpret the gestures made by the user.

In some implementations, the tow vehicle 100 includes a rear camera 410, 410a that is mounted to provide a view of a rear driving path for the tow vehicle 100. Additionally, in some examples, the tow vehicle 100 includes a front camera 410, 410b to provide a view of a front driving path for the tow vehicle 100, a right camera 410, 410c positioned on the right side of the tow vehicle 100, and a left camera 410, 410d positioned on the left side of the tow vehicle 100. The left and right cameras 410, 410c, 410d provide additional side views of the tow vehicle 100. In this case, the tow vehicle 100 may detect object and obstacles positioned on either side of the tow vehicle 100, in addition to the objects and obstacle detected along the front and rear driving paths. The camera(s) 410, 410a-d may be a monocular camera, binocular camera, or another type of sensing device capable of providing a view of the rear travelling path of the tow vehicle 100.

In some implementations, the tow vehicle 100 includes one or more Neural Networks (NN) 500, for example, Deep Neural Networks (DNN) to improve the autonomous driving of the tow vehicle 100. DNNs 500 are computational approaches used in computer science, among other disciplines, and are based on a large collection of neural unites, loosely imitating the way a biological brain solves problems with large clusters of biological neurons connected by axons. DNNs 500 are self-learning and trained, rather than programed, and excel in areas where the solution feature detection is difficult to express in a traditional computer program. In other words, DNNs 500 are a set of algorithms that are designed to recognize patterns. DNNs 500 interpret sensor system data 402 (e.g., from the sensor system 400) through a machine perception, labeling or clustering raw input. The recognized patters are numerical, vectors, into which all-real-world data, such as images, text, sound, or time series is translates. The DNN 500 includes multiple layers of nonlinear processing units 502 in communication with DNN non-transitory memory 504. The DNN non-transitory memory 504 stores instructions that when executed on the nonlinear processing units 502 cause the DNN 500 to provide an output 506, 508. Each nonlinear processing unit 502 is configured to transform an input or signal (e.g., sensor system data 402) using parameters that are learned through training. A series of transformations from input (e.g., sensor system data 402 in the form of user gestures) to outputs 506, 508 occurs at the multiple layers of the nonlinear processing units 502. Therefore, the DNN 500 is capable of determining the location based on images 412 or sensor data 422 eliminating the need to have a DGPS or a GPS.

The DNN 500 receives sensor system data 402 (including images 412 and/or sensor data 422) and based on the received data 402 provides an image output 506 to the user interface 140 and/or a data output 508 to the vehicle controller 300. In some examples, the DNN 500 receives image(s) 412 of a rear view of the tow vehicle 100 from the camera 410 in communication with the DNN 500. The DNN 500 analyzes the image 412 and identifies one or more gestures by the user in the received image 412. The DNN 500 may also receive sensor data 420 from the sensors 420 in communication with the DNN 500, and analyze the received sensor data 420. Based on the analyzed images 412 (or the analyzed images 412 and the sensor data 422), the DNN 500 identifies the a perceived command from the user, for example by way movement relative to a coordinate system.

In some examples, the user interface also may include a touch screen display 142. In other examples, the user interface 140 is not a touchscreen and the driver may use an input device, such as, but not limited to, a camera, a rotary knob or a mouse In one example embodiment the user interface 140 may be a combination of a wireless device to provide prompts, and signals to the user and may further include receiving images from the cameras 410, 410a-d, wherein the user may make gestures whose meaning can be interpreted through image analysis, as explained in further detail below.

When the driver performs a command gesture the gesture recognition system 560 interprets the meaning of the gesture, e.g. stop, move right, etc, and the path planning system 550 plans a path 552 between the tow vehicle 100 and the trailer 200 based on the gestures (determined by the DNN 500 from the received sensor system data 402).

The tow vehicle 100, therefore, is autonomously following the gestures and backing up towards the selected trailer 200.

In some examples, the gesture recognition system 560a and path planning system 550 are part of the vehicle controller 300 as shown in FIG. 2A; while in other examples, gesture recognition system 560b is part of the DNN 500 as shown in FIG. 2B. Referring to FIG. 2A, when the user performs a gesture viewed by the camera(s) 410, 410a-d, the gesture recognition system 560, 560a located in controller 300 determines the command associated with that particular gesture. In this case, the path planning system 550a receives the information and plans the next step in the path 552 between the tow vehicle 100 and the selected trailer 200. The path planning system 550a may use several methods to determine the path 552.

Referring back to FIG. 2B, in some implementations the DNN 500 includes the gesture recognition system 560, 560b. As such, the gesture recognition system 560, 560b may determine the command associated with that gesture based on learned behaviors. For example, the DNN 500 determines the between variations in how the gesture is performed, which may occur among different users, slight movement, exaggerated movement, arms/hand held higher or lower, etc.

Referring back to FIGS. 2A and 2B, once the path planning system 550 plans a path 552, the path following sub-system 320 is configured to execute behaviors the cause the drive system 110 to autonomously follow the planned path 552. Therefore, the path following sub-system 320 includes one or more behaviors 322-330 that once executed allow for the autonomous driving of the tow vehicle 100 along the planned path 552. The behaviors 322-330 may include, but are not limited to a braking behavior 322, a speed behavior 324, a steering behavior 326, a hitch connect behavior 328, and a suspension adjustment behavior 330.

The braking behavior 322 may be executed to either stop the tow vehicle 100 or to slow down the tow vehicle based on the planned path 552. The braking behavior 322 sends a signal or command 301 to the drive system 110, e.g., the brake system 120, to either stop the tow vehicle 100 or reduce the speed of the tow vehicle 100.

The speed behavior 324 may be executed to change the speed of the tow vehicle 100 by either accelerating or decelerating based on the planned path 552. The speed behavior 324 sends a signal or command 301 to the brake system 120 for decelerating or the acceleration system 130 for accelerating.

The steering behavior 326 may be executed to change the direction of the tow vehicle 100 based on the planned path. As such, the steering behavior 326 sends the acceleration system 130 a signal or command 301 indicative of an angle of steering causing the drive system 110 to change direction.

Referring to FIGS. 5A-5D, in some examples, the tow vehicle 100 is autonomously maneuvered along the planned path 552 until the tow vehicle 100 reaches an intermediate position $P_M$ being an intermediate distance $D_M$ from the selected trailer 200, as shown in FIG. 3A. In the intermediate position $P_M$, the tow vehicle hitch 160 is in an orientation aligned generally parallel with the selected trailer 200 and the tow vehicle hitch 160 is substantially aligned with the hitch 210 of trailer hitch 210. In other words, the vehicle fore-aft Y defines a plane that extends along the vehicle vertical axis Z and along the trailer fore-aft T along a trailer vertical axis. In some examples, the intermediate distance $D_M$ is about 1 meter.

Figure 3D:
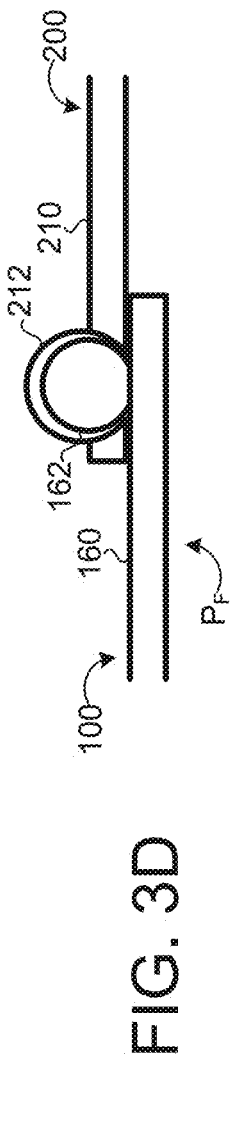
Figure 5C:
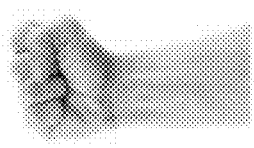
FIGS. 5A-5E are schematic views of a second set exemplary user gestures for control input for the driver assistance system.
Figure 5E:
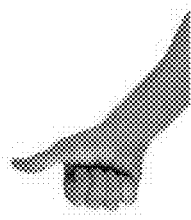
Figure 5B:
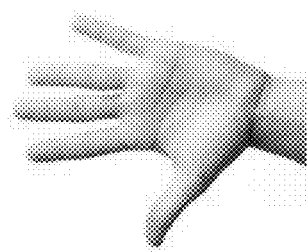
Figure 5A:
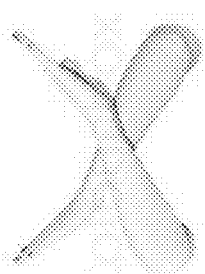
Figure 5D:
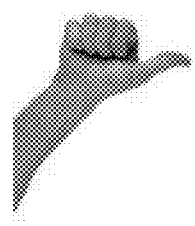

When the tow vehicle 100 is in the intermediate position $P_M$ a hitch connect behavior 328 may be executed to connect the vehicle hitch 160 with the trailer hitch 210. The user determines a relative height $H_R$ between a top portion of the tow vehicle hitch ball 162 and a bottom portion of the trailer hitch coupler 212. To connect the tow vehicle 100 and the selected trailer 200, the trailer hitch coupler 212 releasably receives the tow vehicle hitch ball 162. Therefore, to connect the tow vehicle hitch ball 162 to the trailer hitch coupler 212, the relative height $H_R$ has to equal zero allowing the tow vehicle hitch ball 162 to move under and be inserted in the trailer hitch coupler 212. Therefore, when the user notices relative height $H_R$ that is greater than zero between the tow vehicle hitch ball 162 and the trailer hitch coupler 212 from the user performs a gesture which can be interpreted by the DNN and/or controller 300 to adjust the suspension system (e.g. lowering arm toward the ground), the gesture recognition system 560, 560a, 560b sends a command to the suspension adjustment behavior 330 to execute and issue a command 301 to the suspension system 132 to adjust the height of the tow vehicle 100 reducing the relative height $H_R$. When the user perceives the relative height $H_R$ that is equal to zero, then the user performs another gestures which is interpreted by the DNN 500/controller 300 which issues a command 301 to the drive system 110 to maneuver along the remainder of the path 552, i.e., from the intermediate position $P_M$ to a final position $P_F$ (FIG. 3D), connecting the tow vehicle 100 to the selected trailer 200.

Referring to FIGS. 1, 2A, 2B and FIGS. 4A-4D, a control system 560, 560a, 560b and method for providing user input is described. In this embodiment the user can control the Auto-Hitch Driver Assistance System 310 by making various gestures. As previously discussed, the gesture recognition system 560, 560a, 560b located in the DNN 500 or controller 300 receives images 412 from camera 410, 410a-d and/or sensor data 422 from sensors 420 and based on the received data 402 provides an image output 506 to the user interface 140 and/or a data output 508 to the vehicle controller 300. In this embodiment user interface 140 may be and/or include communication with a wireless device and/or audible prompts which the user can receive outside of the tow vehicle 100.

In this example, the gesture recognition system 560, 560a, 560b located in the DNN 500 or controller 300 receives image(s) 412 of a rear view and possibly side view of the tow vehicle 100 from the camera 410, 410a-d in communication with the gesture recognition system 560, 560a, 560b located in the DNN 500 or controller 300. The gesture recognition system 560, 560a, 560b located in the DNN 500 or controller 300 analyzes the image 412 using the processing units 502, 502a-n and identifies one or more gestures in the images, which are performed by the driver in view of the camera 410, 410a-d. Gesture recognition and specific meaning associated with each gesture may be carried out by training the DNN 500 in the manner of DNN 500 learning previously discussed.

Based on the analyzed images 412 (or the analyzed images 412 and the sensor data 422), the gesture recognition system 560, 560a, 560b located in the DNN 500 or controller 300 identifies the gestures and associates the gesture with a given command, e.g. stop, pause, move in reverse, lower suspension, raise suspension, move forward, move to the right direction, change move to the left direction, repeat path planning and final alignment path following, etc. Gestures may be selected to be "intuitive" of those typically used in providing direction to drivers of backing trailers. Arm gestures, as illustrated in FIGS. 4A-D, or similar hand gestures as illustrated in FIGS. 5A-E may be used. The gesture recognition system 560, 560a, 560b located in the DNN 500 or controller 300 sends the command to the path planning system 550, 550b which interprets the behavior and sends to the path following sub-system 320 to follow the maneuver as directed by the command associated with the detected gesture.

Further, analysis of image 412 is also used to determine a location of the user performing the control gestures relative to the tow vehicle 100, and to the planned path once determined, and the processing units 502, 502a-n or the path planning system 550, 550b confirm the user is in a safe location prior to providing the signal/command 301 to the drive system 110. If the user is not in a safe location the user may be prompted through image, text and/or audible command prior to release of the tow vehicle 100 for movement. The analysis of image 412 and safety check of the user relative to the planned path of the tow vehicle 100 will them be repeated prior to release of the tow vehicle 100. Alternatively or in addition, the user may provide input the user interface 140 that they are now in a safe location and the safety check image analysis should be repeated. Additionally to stay within view of the camera 410, 410a-d and to stay in a safe location the user may need to move as the tow vehicle 100 moves, indicated by arrow.

In one embodiment, the driver assistance system 310 is designed to work real-time in which the tow vehicle 100 moves as the user inputs the directions. Therefore, the image analysis for gesture recognition by the gesture recognition system 560, 560a, 560b located in the DNN 500 or controller 300, path planning and user position safety check are continuously repeated during movement of the tow vehicle 100 to the final trailer location.

FIGS. 4A-D and 5A-E illustrate example gestures that the user may employ while using the vehicle 100 and trailer 200. The gestures shown are only meant to be exemplary in nature, one skilled in the art would be able to determine gestures that are commonly or intuitively known in directing vehicles. Further, selected gestures which are not commonly known may be selected and taught to the gesture recognition system 560, 560a, 560b located in the DNN 500 or controller 300 for any command, e.g. a command specific to backing a vehicle to a trailer which does not already have a common gesture.

FIGS. 4A-D include gestures that may involve movement by the user in making the gesture, e.g swing arms in one direction or another, circling a hand to indicate repeat, pushing a hand or hands forward to indicate stop or pause. FIGS. 5A-E illustrate gestures that do not involvement and the stationary hand and/or arm positions give meaning to the requested input.

Referring to FIG. 4A, the user moving their left hand toward the left, may indicated a desire to change the movement in that direction, such that the vehicle 100 moves more in that direction. In FIG. 4B, the user moving their right hand toward the right which may indicate a desire to change the movement in that direction, such that the vehicle 10 moves more in that direction. The user moving one or both hands toward their body, shown in FIG. 4C, may indicate a desire to continue in the current direction of movement. The user moving or holding one or both hands away from their body may indicate a desire to stop, FIG. 4D. Other arm and hand gestures may also or alternatively be employed.

Referring to FIG. 7A, the user crossing the forearms, may indicated a desire to stop motion of the vehicle 100. In FIG. 7B, the user holds out a flat hand with fingers extended which may indicate a desire to pause motion of the vehicle 100. The control system 310 can therefore, distinguish between a desire to stop, e.g. place the car in park and/or stop all autonomous motion and the desire for the vehicle 100 to merely pause, e.g. hold the brake while waiting further instructions. The making a first with one hand, shown in FIG. 7C, may indicate a desire to continue motion in the current direction of movement or to continue motion after a pause. Further a thumbs up from the user, FIG. 7D, may indicate a desire to raise the vehicle suspension and a thumb down form the user, FIG. 7E, may indicate a desire to lower the vehicle suspension. Other arm and hand gestures may also or alternatively be employed.

Figure 6:
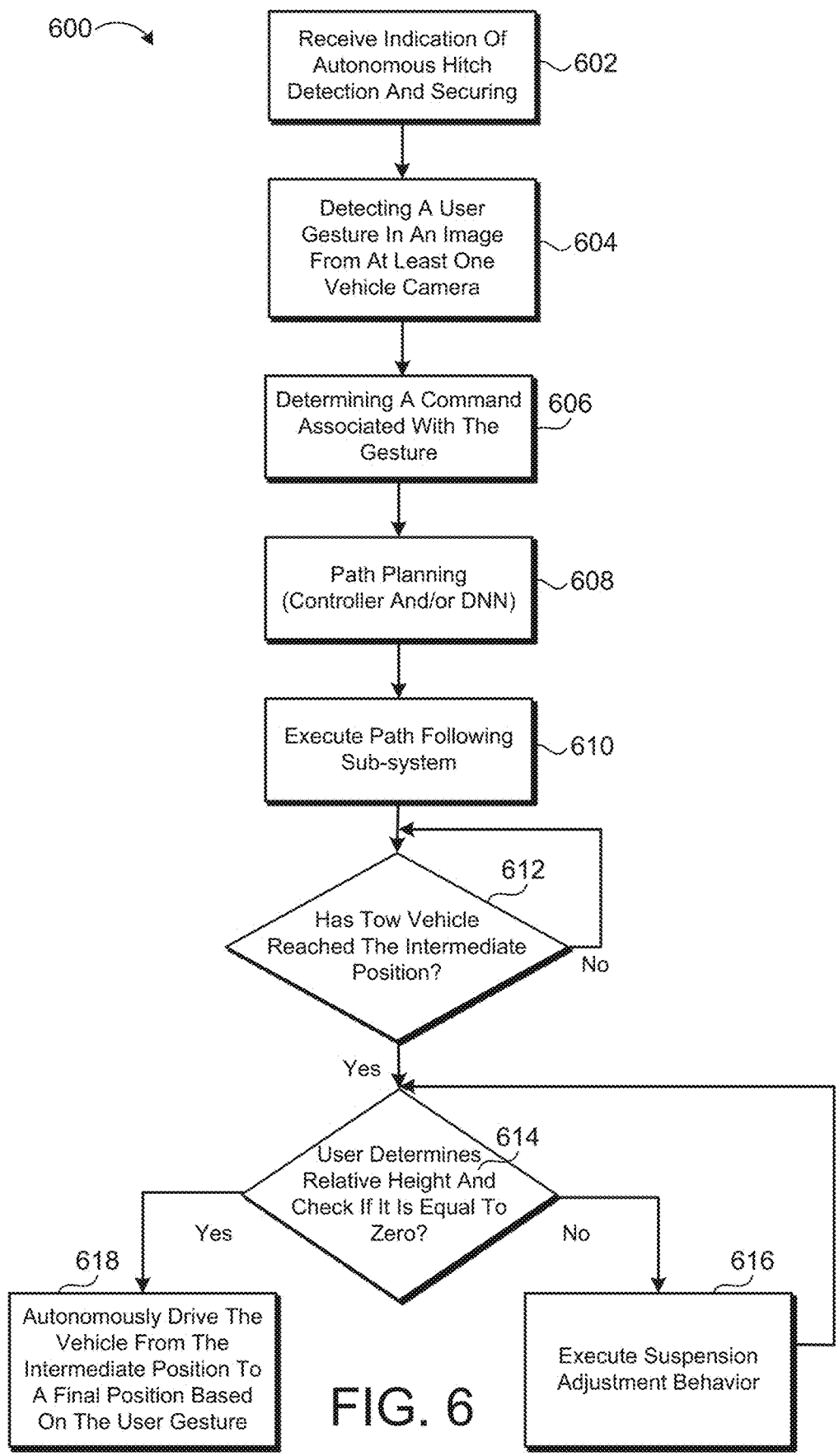
FIG. 6 is a flow diagram of an exemplary arrangement of operations for operating a tow vehicle in reverse for attachment to a trailer.

FIG. 6 illustrates an example arrangement of operations for a method 600 of autonomously maneuvering a tow vehicle 100 (as shown in FIGS. 1-5) towards a selected trailer 200, 200. At block 602, the method 600 includes receiving an indication that a driver wants to autonomously hitch the tow vehicle 100 to a trailer 200 and initiating a hitch assist mode. The indication may be by way of a selection on the user interface 140 of the tow vehicle 100, putting the tow vehicle in reverse (without reversing), or any other indication. At block 604, a camera 410, 410a-d detects a gesture performed by a user in view of the camera. At decision block 606, the gesture recognition system 560, 560a, 560b performs image analysis determine a vehicle command associated with that gesture. In some examples, the gesture recognition system 560, 560a, 560b may be part of the controller 300 or part of the DNN 500. The requested command is send from the gesture recognition system 560, 560a, 560b to a path planning system 550, 550a, at block 608, the method 600 includes planning a path 552 based on the command. At block 610, the method 600 includes executing the path following sub-system 320. At decision block 612, the user determines if the tow vehicle 100 is within a predetermined distance from the selected trailer 200, i.e., the intermediate position $P_M$. When the tow vehicle 100 reaches the intermediate position $P_M$, the user at decision block 612 determines a relative height $H_R$ between a top portion of the hitch ball 162 of the tow vehicle 100 and a bottom portion of the hitch coupler 212 of the selected trailer 200 and determines if the hitch coupler 212 can releasably receive the hitch ball 162 based on the relative height $H_R$. In other words, the user determines if the relative height $H_R$ equals to zero. If the relative height $H_R$ is not equal to zero, then at block 616, the user adjusts the suspension of the tow vehicle 100 through the appropriate gesture which is interpreted by the gesture control system (and ultimately sent to the suspension adjust behavior 330. The user repeats until they determines the relative height $H_R$ and checks if the relative height $H_R$ equals zero at block 614. Once relative height $H_R$ is equal to zero, then the method 600 at block 618 continues maneuvering about the path 552 from the intermediate position $P_M$ to a final position $P_F$ connecting the hitch ball 162 of the tow vehicle 100 with the hitch coupler 212 of the selected trailer 200.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of maneuvering a vehicle in reverse for attachment to a trailer, the method comprising:
   receiving an indication of an autonomous hitch mode is started;
   detecting at least one first gesture performed by a user and captured in at least one image from at least one camera on the vehicle;
   determining a first command associated with the at least one first gesture using a gesture recognition system;
   planning a path based on the first command with a path planning system and maneuvers to follow the path;
   executing the maneuvers to move the vehicle along the path from an initial position toward an intermediate position being an intermediate distance along the path from a final position;
   at the intermediate position, receiving a second gesture performed by the user, the second gesture including a suspension adjustment gesture;
   determining a second command associated with the suspension adjustment gesture using the gesture recognition system;
   executing a suspension adjustment behavior causing a suspension system of the vehicle to adjust;
   receiving a third gesture performed by the user;
   determining a third command associated with the third gesture using the gesture recognition system; and
   executing the maneuvers to move the vehicle along the path from the intermediate position to the final position adjacent the trailer.

2. The method of claim 1, wherein the intermediate position is closer to the final position than the initial position.

3. The method of claim 1, further comprising, at the final position, connecting a vehicle hitch with a trailer hitch.

4. The method of claim 1, wherein the maneuvers include steering, braking, and speeding.

5. The method of claim 1, wherein the gesture recognition system is located in a neural network device to learn a plurality of gestures and associate each of the learned plurality of gestures with a command for the vehicle.

6. The method of claim 1, wherein the first and third gestures include at least one of: a stop gesture, a pause gesture, a move in reverse gesture, a lower suspension gesture, a raise suspension gesture, a move forward gesture, a move to the right gesture, a move to the left gesture, repeat path planning gesture, or final alignment path following gesture.

7. A method of maneuvering a vehicle in reverse for attachment to a trailer, the method comprising:
   capturing, from at least one camera supported by a rear portion of the vehicle, images of a user;
   detecting a first gesture performed by the user;
   determining, using a gesture recognition system, a first command associated with the first gesture and causing the vehicle to perform an action;
   executing vehicle maneuvers causing the vehicle to move along a path from an initial position towards an intermediate position being at an intermediate distance along the path from a final position, the vehicle maneuvers based on the first command;
   at the intermediate position, receiving a second gesture performed by the user, the second gesture including a suspension adjustment gesture;
   determining, using a gesture recognition system, a second command associated with the suspension adjustment gesture; and
   executing a suspension adjustment behavior causing a suspension system of the vehicle to adjust.

8. The method of claim 7, further comprising:
   receiving a third gesture performed by the user;
   determining, using a gesture recognition system, a third command associated with the third gesture; and
   executing vehicle maneuvers to move the vehicle along the path from the intermediate position to the final position adjacent the trailer.

9. The method of claim 8, further comprising, at the final position, connecting a vehicle hitch with a trailer hitch.

10. The method of claim 7, wherein the intermediate position is closer to the final position than the initial position.

11. The method of claim 7, wherein the maneuvers include steering, braking, and speeding.

12. The method of claim 7, wherein the gesture recognition system is located in a neural network device to learn a plurality of gestures and associate each of the learned plurality of gestures with a command for the vehicle.

13. The method of claim 7, wherein the first gesture include at least one of: a stop gesture, a pause gesture, a move in reverse gesture, a lower suspension gesture, a raise suspension gesture, a move forward gesture, a move to the right gesture, a move to the left gesture, repeat path planning gesture, or final alignment path following gesture.

* * * * *